H. L. ZABRISKIE.
ALTERNATING CURRENT MOTOR.
APPLICATION FILED FEB. 1, 1913.
1,074,152.
Patented Sept. 30, 1913.
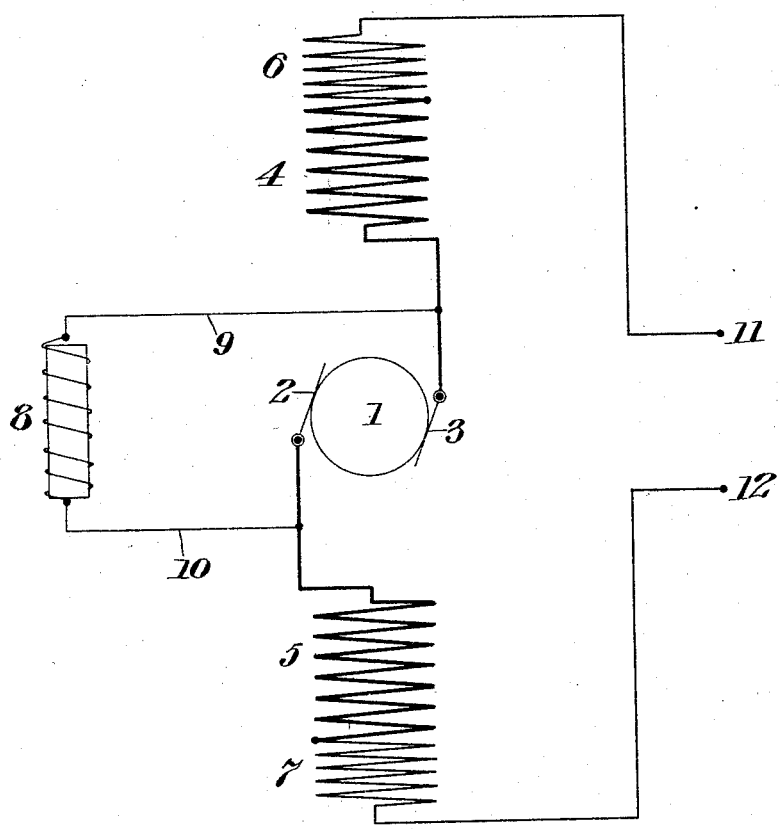

UNITED STATES PATENT OFFICE.

HENRY L. ZABRISKIE, OF WESTFIELD, NEW JERSEY, ASSIGNOR TO DIEHL MANUFACTURING COMPANY, OF ELIZABETH, NEW JERSEY, A CORPORATION OF NEW JERSEY.

ALTERNATING-CURRENT MOTOR.

1,074,152.      Specification of Letters Patent.      Patented Sept. 30, 1913.

Application filed February 1, 1913. Serial No. 745,703.

*To all whom it may concern:*

Be it known that I, HENRY L. ZABRISKIE, a citizen of the United States, residing at Westfield, in the county of Union and State of New Jersey, have invented a certain new and useful Improvement in Alternating-Current Motors, of which the following is a full, clear, and exact description.

This invention relates to that class of small series-wound commutator motors which are usually required to run interchangeably on various periodicities of alternating current, and on direct current, all applications being at substantially the same voltage. In such machines of fractional horse-power, the broad field of application is of greater importance than high efficiency.

When a series wound motor of usual type is wound to run at a certain speed, with a given load, on a one hundred and thirty-three cycle current, at, say one hundred and ten volts, if the periodicity is decreased, keeping the voltage constant, the motor will tend to speed up and overload itself. This effect will increase with decreasing periodicity, until at a current of twenty-five cycles the motor will have run away or be dangerously overloaded. On a one hundred and ten volt direct current, the conditions would be still worse. The main reason for this overloading is that on a current of one hundred and thirty-three cycles, the inductance of the field coils absorbs the greater part of the line voltage, leaving only a small number of volts impressed upon the armature, while with decreasing periodicity the armature voltage will rise, and on direct current the armature will absorb the greater part of the line voltage. A motor of this sort, if designed properly for one hundred and thirty-three cycles alternating current, may be run upon lower frequencies, or on direct current, by inserting a resistance in series with the motor, but such resistance must be adjusted for each different periodicity or for direct current.

The object of this invention, therefore, is to provide a motor that may be run on any periodicity of alternating current from about one hundred and thirty-three cycles to about twenty-five cycles, and on direct current of the same voltage without any change of connections in the motor or any adjustment whatever.

The invention consists in a series-wound motor, having an inductive resistance coil connected in shunt across the armature terminals; and also having its field coils wound with a main winding and an additional series winding of high resistance, all substantially as I will proceed now more particularly to set forth and finally claim.

The accompanying drawing illustrates the invention diagrammatically.

In the drawing, 1 indicates the commutator of a series-wound motor, and 2 and 3 the commutator brushes.

4 and 5 indicate the main windings or coils of the field, preferably of copper and to be wound in any usual manner.

6 and 7 indicate sections of the field windings or coils of high resistance wire and preferably of few turns, as compared with the main winding, thus giving resistance with low inductance.

8 indicates an inductive resistance coil, of any approved construction, connected with the armature terminals by connections 9 and 10, to thereby shunt a certain amount of current around the armature, and thus weaken the armature and strengthen the field, the amount of shunted current varying automatically as the conditions of operation may require.

In order to secure maximum torque on one hundred and thirty three cycles, the inductive resistance coil 8 must be so proportioned that its inductance will practically eliminate the shunted current at this periodicity, while for direct current, the resistance of this coil must be such that it will maintain the current in the coil itself at a safe value, and at the same time keep the impressed electromotive force on the armature as low as possible, thus limiting its counter electromotive force and its speed.

11 and 12 are the terminal connections for the supply.

The operation of the motor is as follows:—The motor being designed for normal operation on a one hundred and thirty-three cycle current, the inductive resistance coil 8 will be so proportioned to the armature winding that it will pass very little current at this periodicity and will have practically no effect on the armature or field. The resistances 6 and 7 of the field windings are of low self-induction, as above stated, and their resistance drop is provided for in the main field windings 4 and 5, and with decreasing periodicity of current and constant line voltage, the inductive drop of the main field windings 4 and 5 decreases, thus increasing the impressed armature voltage and tending to speed up the armature and increase the load current. This tendency to speed up and increase the load is largely balanced by the inductive resistance coil 8 which shunts around the armature a larger portion of the total current, due both to the increase of armature voltage and to its own decrease of self-induction with the lower periodicity. The inductive resistance coil 8, therefore, constitutes an effective limit upon the rising counter electromotive force of the armature, and hence upon its speed. Furthermore, the increased current acts directly upon the field coils and tends to keep the speed down, both by increasing the ampere turns and flux of all the field coils and by increasing the resistance drop of the resistance field windings 6 and 7. The resultant effect, therefore, of a motor constructed in accordance with this invention, is to give the motor characteristics somewhat similar to a shunt machine, and in fact the motor will not speed up excessively, even when load is entirely removed. When running on direct current, the inductive resistance coil must depend upon its own resistance to keep the shunted current at a safe value, and is, therefore, wound with a wire of high specific resistance, as above stated.

The power factor of such a motor as herein described is not lower than that of a similar series-wound motor, and while the efficiency is lower this is not of controlling importance in view of the results obtained.

The motor of the present invention is particularly adapted for use in operating rotary or centrifugal fans, but it is applicable to other devices or machines, wherein the load increases rapidly with increase of speed, and under this condition such a motor will give substantially uniform speed under all frequencies of its range and on direct current.

What I claim is:—

In an alternating current motor, the combination with a series wound field, and an armature and commutator therefor, of an inductive resistance shunted across the terminals of said armature, and a high resistance winding incorporated as a part of each field coil winding, thereby adapting the motor for use on direct current.

In testimony whereof I have hereunto set my hand this 30th day of January A. D. 1913.

HENRY L. ZABRISKIE.

Witnesses:
HENRY A. KORNEMANN, Jr.,
WM. P. STEWART.